Jan. 19, 1971 J. E. SPENCE ET AL 3,555,910
SAMPLING APPARATUS
Filed June 16, 1969 2 Sheets-Sheet 1

INVENTORS.
JOHN E. SPENCE
ANDREW CLARK ELBERT
BY
ATTORNEY.

Jan. 19, 1971   J. E. SPENCE ET AL   3,555,910
SAMPLING APPARATUS
Filed June 16, 1969   2 Sheets-Sheet 2
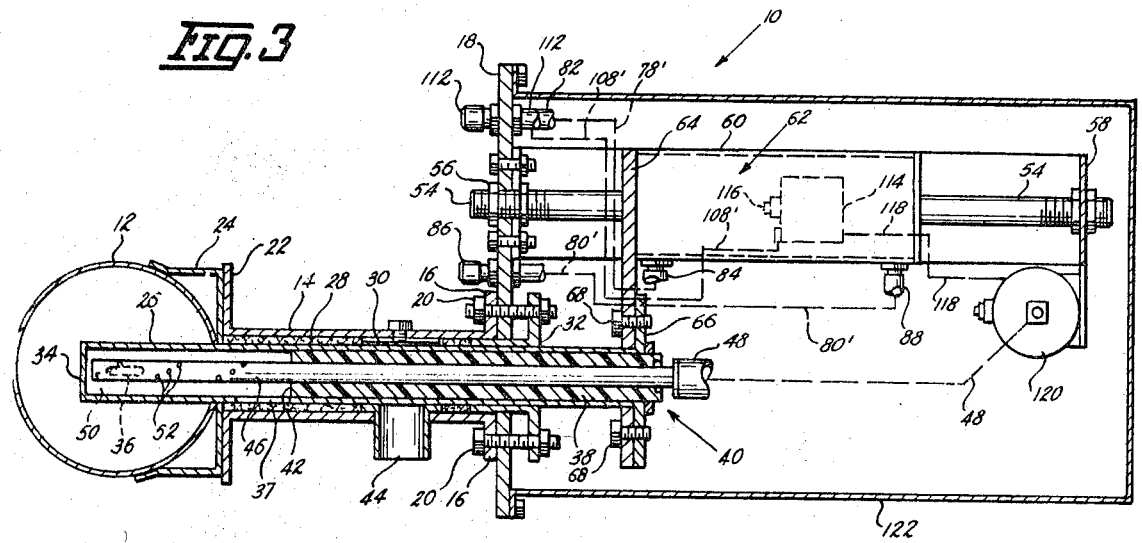
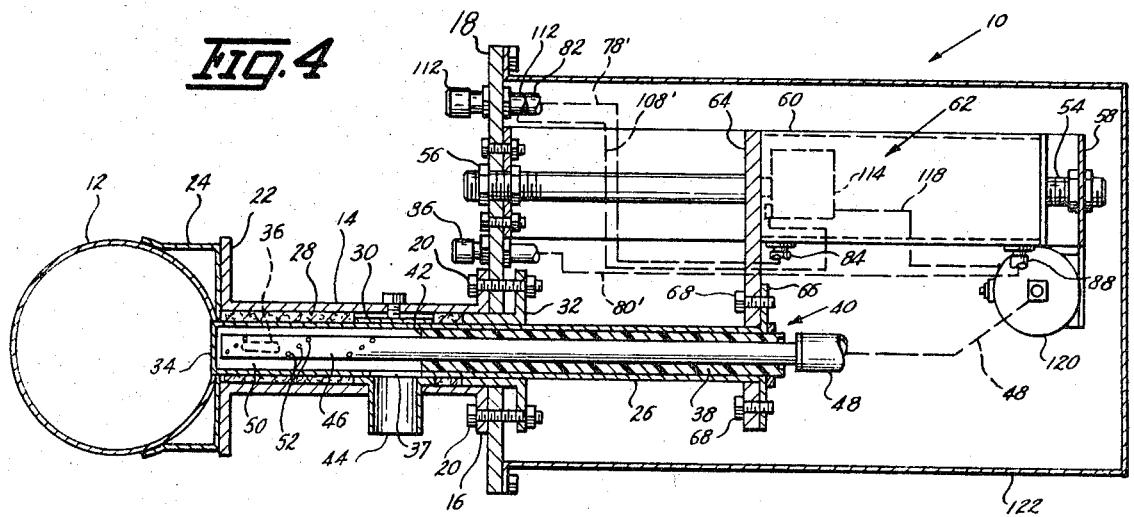
INVENTORS.
JOHN E. SPENCE
ANDREW CLARK ELBERT
BY *Morton S. Adler*
ATTORNEY.

United States Patent Office 3,555,910
Patented Jan. 19, 1971

3,555,910
SAMPLING APPARATUS

John E. Spence, Carlisle, and Andrew Clark Elbert, Des Moines, Iowa, assignors to Quality Control Equipment Company, Inc., Des Moines, Iowa, a corporation of Iowa
Filed June 16, 1969, Ser. No. 833,318
Int. Cl. G01n
U.S. Cl. 73—422        6 Claims

ABSTRACT OF THE DISCLOSURE

Apparatus to periodically withdraw sample amounts of free flowing material from a continuous stream of such material for purposes of testing said samples. Such materials may be in a pressurized or non-pressurized tube, conduit or chute and the sample is obtained by extending a sample gathering apparatus into the tube or conduit capable of intercepting a portion of the moving material and then retracting the sample. The removal of the sample from the sampling device is accomplished by a controlled blast of air under pressure to move the material into an appropriate sample collecting container. This sampling apparatus is usable with free flowing granular material such as grain and the like and also with fluids.

BACKGROUND OF THE INVENTION

(1) Field of the invention

This invention relates to improvements in sampling apparatus for periodically withdrawing sample amounts of free flowing material for purposes of testing and more particularly relates to a new and improved air pressure system for removing the sample material from the sample collecting device.

(2) Description of the prior art

Sampling devices per se are old and well known and have long been used under a variety of circumstances for collecting sample materials of both free flowing solids and fluids from flow lines for the purpose of testing. Some form of these devices provide for a sample pickup element to be fixed within the line of flow and other forms utilize what is known as the retractable sampling device which is periodically inserted into the flow line and withdrawn after the sample has been collected.

In removing the sample material from the sample collecting apparatus particularly in the case of granular material, the prior art discloses generally the use of some form of a conveying screw whereby the sample material is moved into registration with a discharge chute, spout or port so as to move out of the sampling chamber by gravity. Likewise, in the case of the sampling of fluids, gravity drains are also provided in one form or another. The screw conveyor means for emptying the sampling device while basically satisfactory, nevertheless is susceptible to certain disadvantages due to the frequent occurrence of material becoming lodged between the conveyor screw and the tube in which it is mounted. This is frequently a source of difficulty and stoppage and the primary object of the present invention is to eliminate entirely the use of the conveyor screw concept in a sampling tube and to substitute therefor a new and improved pressurized air means for emptying such tube.

SUMMARY

The present invention is of the type known as a retractable sampling device in that it is suitably mounted relative to a flow conduit or tube so that a sample obtaining element can be periodically extended into the flow area of the tube for collecting the sample and withdrawn according to a predetermined cycle. Preferably, the present invention is designed for use in a tube or conduit whereby the material is flowing under pressure but it is not limited to this type of material delivering system and may be used wherever material is flowing by gravity as well.

The sample collecting element comprises a cylindrical member having an appropriate aperture which can be oriented in relation to the direction of flow of material to intercept a predetermined amount of the same so that it is immaterial whether the material is moving in a vertical or horizontal plane. Located within the sample pickup tube is an air tube suitably connected to a source of air under pressure and in which there is provided a plurality of openings relative to the area of the pickup tube where the material is collected. The extension and retraction of the pickup tube relative to the flow conduit is accomplished by an air cylinder operating on a prescribed cycle and the travel of the pickup tube in its retractable movement is designed to place it completely outside of the flow conduit and in registration with a discharge port for delivery to a point of deposit or a suitable collecting container. This sampler is designed so that when the collecting tube has fully retracted, an air valve is actuated by the air cylinder which opens an air pressure line to a timing valve that in turn opens the air pressure line to the air tube within the collecting tube whereby the collected material is, in effect, blasted out of the discharge port under air pressure. The timing valve is preset for selected intervals of operation as may be determined necessary with the type of material being tested and will shut off the flow of air to the tube at designated intervals.

This air pressure or air blast system eliminates entirely the necessity for a screw conveyor and the required motor for operating the same and at the same time provides a thorough and complete emptying of the collecting tube whereby it is also rendered thoroughly clean for the next sample collecting operation.

The objects of this invention together with details of the structure outlined and the advantages of the same will be more fully described and developed in relation to the more detailed description of the accompanying drawings.

DESCRIPTION OF THE DRAWINGS

FIG. 3 is a longitudinal section view taken on the line 3—3 and showing the retractable sampler tube in extended position within the conveying tube, FIG. 4 is a sectional view similar to FIG. 3 but showing the sampler tube retracted from the conveying tube.

DESCRIPTION OF THE PREFERRED EMBODIMENTS

Figure 1:
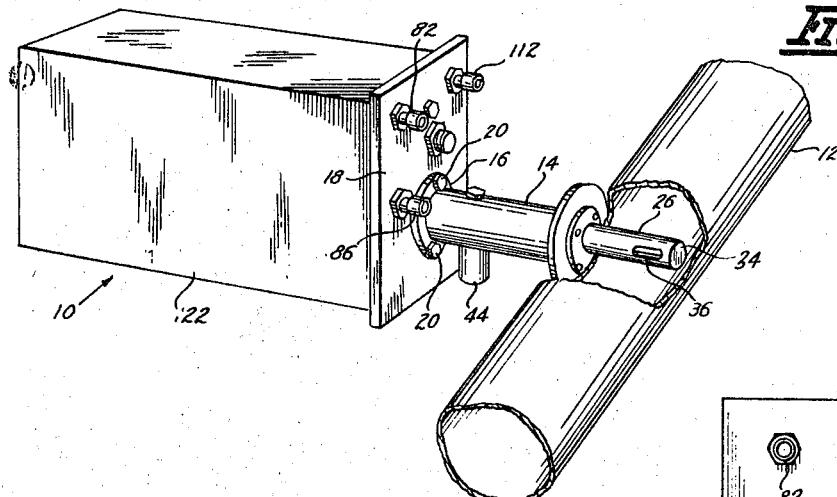
FIG. 1 is a perspective view of this sampling apparatus shown mounted relative to a conveying tube which is partially cut away to more clearly illustrate the relationship of the sampler to the tube.
Figure 2:
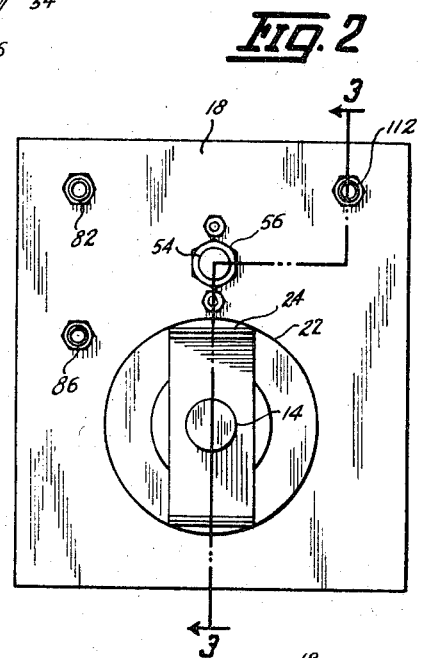
FIG. 2 is an enlarged elevational view of the front mounting plate shown in FIG. 1.

Referring to the drawings, this sampling apparatus is designated generally by the numeral 10 and as seen in FIG. 1, is shown mounted relative to a conveying conduit 12. Conduit 12 is shown for illustration in the form of a tube but it may be rectangular or square, may be arranged vertically or horizontally and material or fluids moving therethrough may be doing so either by gravity or pneumatic pressure. The function of apparatus 10 is to periodically remove sample amounts of material passing through conduit 12 for purposes of testing and for this purpose, apparatus 10 is constructed and operates as follows.

A cylindrical housing 14 having the peripheral mounting flange 16 on its inner end is attached to the main mounting plate 18 of apparatus 10 by suitable mounting bolts 20, said housing being so arranged that it extends through the mounting plate 18 as best seen in FIGS. 3 and 4. At the outer end of housing 14 there is provided the peripheral mounting flange 22 to which there is attached a suitable mounting bracket 24 for effecting an adequate attachment of the housing to the circular tube 12. In this regard, it will be understood that if member 12 is flat or square, an appropriate mounting bracket for such shape will be utilized.

A steel pickup tube 26 is slidably disposed within housing 14 so as to be movable at times into conduit 12 as seen in FIG. 3 and to be retracted from such conduit as seen in FIG. 4 and which will be referred to in more detail as this description proceeds. Intermediate tube 26 and housing 14 there is suitable packing 28, a packing spacing means 30 and a packing adjustment fitting 32 all arranged in a well known manner. Adjustment fitting 32, as seen in FIGS. 3 and 4, is engaged by bolt 20 and can be adjusted thereby. The outer end 34 of tube 26, being the end disposed relative to conduit 12, is closed and a sample intake slot 36 is provided in the wall of tube 26 closely adjacent end 34 as best seen in FIG. 1. Tube 26 may be oriented in any required position for slot 36 to intercept samples of moving materials when apparatus 10 is in operating position. A discharge port 37 is provided in tube 26 at a point remote from slot 36.

A nylon plug 38 is mounted within the pickup tube 26 so as to extend from the inner end 40 of tube 26 toward end 34 to point 42. In the extended position of tube 26 shown in FIG. 3, plug 38 will extend across and serve as a closure for the discharge pipe or chute 44 depending from the tube 26. In the retracted position of tube 26 as seen in FIG. 4, the end 42 of plug 38 will be aligned with the inner end of the discharge chute 44 as seen in FIG. 4 so that said chute will be open when port 37 is in registration therewith.

Disposed within the pickup tube 26 so as to be journalled through and secured by plug 38 is the air ejector tube 46 which is preferably of stainless steel. Tube 46 projects from the inner end 40 of tube 26 where it is attached to a suitable flexible air hose line 48, and at the other end, tube 46 extends to a point closely adjacent end 34 of tube 26 and we prefer to position it approximately one-sixteenth of an inch from end 34. Thus far described, it will be seen that that portion of tube 46 between end 34 of tube 26 and end 42 of the plug 38 is substantially axially disposed within tube 26 so as to provide the surrounding pickup sample chamber 50. In the length of the air ejector tube 46 which corresponds to the pickup chamber 50, there is provided a plurality of spirally arranged openings or perforations 52 in the wall of such pipe.

A shaft 54, above and in a parallel plane to tube 26, is mounted at one end to the main mounting plate 18 by suitable bolt means 56 and at its other end to a support 58 which is a part of a general elongated frame support means 60. Slidable on shaft 54 is the two way air cylinder 62 of any suitable type for which no invention is claimed per se. Cylinder 62 includes a front plate 64 which extends downwardly for abutting engagement with a peripheral flange 66 on the pickup tube 26 at end 40 and such plate 64 is attached to flange 66 by suitable bolt means 68 whereby as cylinder 62 moves forwardly and rearwardly as will be described, tube 26 will be extended into conduit 12 and retracted therefrom accordingly.

The air pressure system used with this sampling apparatus is conventional and well known and is shown here generally schematically for purposes of illustration. In this regard, an air hose 70 (FIG. 5) will connect to a supply of air under pressure (not shown) and such air hose will be provided with a suitable filter 72, a regulator 74 and an oiler 76 in a well known manner. Air lines 78 and 80 which are each attached to air line 70 are used for operating the air cylinder 62 as follows. Line 78 will connect to the air hose fitting 82 on plate 18 to connect with air line 78' as seen in FIG. 3 which connects to the air fitting 84 at the forward end of air cylinder 62. Thus when air is moving through air lines 78 and 78', air cylinder 62 will be moved rearwardly or to the right as seen in FIG. 3. Air line 80 connects to the fitting 86 on plate 18 to connect with line 80' that in turn is attached to air fitting 88 at the rear of air cylinder 62 so that when air is moving through line 80 and 80', cylinder 62 will move forwardly or toward the left as seen in FIG. 3.

Figure 5:
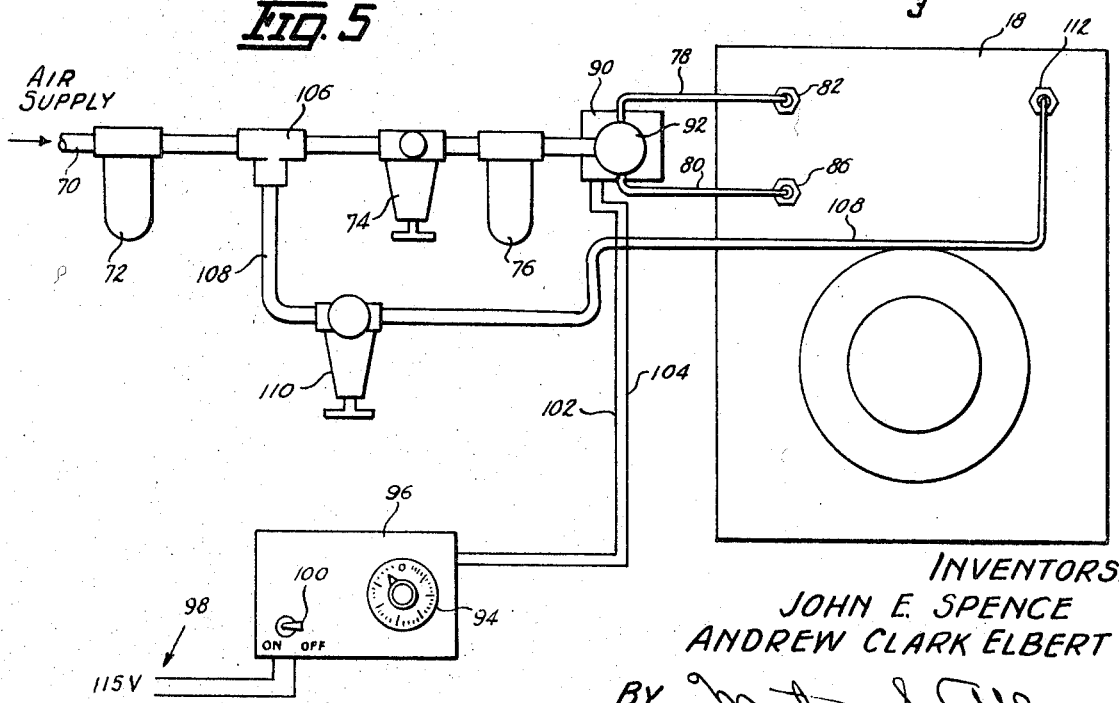
FIG. 5 is a schematic view showing the air lines and control blocks and their relative association with the mounting plate.

The movement of air from line 70 into either line 78 or 80 is controlled by a suitable valve 90 of any well known type and thus is shown only schematically in FIG. 5. Valve 90 is operable by a solenoid 92 which alternatively opens and closes lines 70 and 80 to the source of air supply whereby the air cylinder 62 is moved alternatively rearwardly and forwardly. The time interval in these respective movements of the air cylinder 62 can be selectively determined by the periodic operation of solenoid 92 from the adjustable timer 94 mounted on a suitable control box 96 which will be connected to a source of 115 v. current 98 and an on-off switch 100. Control box 96 is connected to solenoid 92 by the leads 102 and 104 in a well known manner.

In line 70, intermediate the filter 72 and regulator 74 and particularly ahead of the oiler 76, we have placed a T fitting 106 to which there is connected the air ejector line 108 passing through a regulator 110 and extending to the air fitting 112 on the main mounting plate 18. Through fitting 112, air line 108 continues as line 108' where it is connected to a suitable air valve means 114 conveniently mounted on frame 60 as best seen in FIGS. 3 and 4. Air lines 108 and 108' provide air under pressure at all times to the valve means 114 when apparatus 10 is in use. Movement of air through valve 114 is controlled by the switch 116 and when actuated, as will appear, permits air to move through the air line 118 to a time delay air valve 120 that is in turn connected to the air line 48 attached as described to the end of the air tube 46 which is disposed within the pickup tube 26. Valve 120 is suitably attached to support member 58 of frame 60 and the entire assembly of parts including frame 60, cylinder 62 and related parts to the rear or right side of the mounting plate 18 as seen in FIGS. 3 and 4 are enclosed by a suitable cover 122.

OPERATION

In the operation of this apparatus after it has been mounted relative to a flow conduit such as illustrated in FIG. 1, the initial position of the pickup tube 26 will be retracted relative to conduit 12 as seen in FIG. 4. In this position with the air system in operation, air will be moving through lines 78 and 78' into the forward end of the air cylinder 62 through fitting 84 so that such cylinder is in its rearward position and by the connection of the front cylinder plate 64 to the rear flange 66 on the pickup tube 26, such pickup tube will be in its retracted position. The timer 94, which can be set for a predetermined cycle operation in a well known manner, will operate to actuate solenoid 92 to switch the air flow in line 70 from line 78 to line 80 at the predetermined intervals whereby air will move through line 80 and 80' to the rear of air cylinder 62 causing the cylinder to move forwardly and correspondingly moving the pickup tube into its extended position within conduit 12 as seen in FIG. 3. This will expose slot 36 to the flowing material whereby such material will be collected into chamber 50 during the short time interval in which tube 26 is extended. The operation of solenoid 92 according to the predetermined cycle will return the flow of air to lines 78 and 78' to move the air cylinder 62 rearwardly and retract the pickup tube 26 so that such tube is retracted to the position shown in FIG. 4 and at this point the forward or front plate 64 of cylinder 62 will engage and depress switch 116 on air valve 114. Such valve will at all times be connected to air pressure from lines 108 and 108' as previously described. Upon the actuation of switch 116, air will move through line 118 to the time delay pneumatic switch 120 which will in effect connect line 48 to line 118 to permit an air blast or pressurized air stream into the air tube 46 for a predetermined time interval. Such air stream will emerge from tube 46 through the perforations 52 and effectively blow or blast all of the collected material out of chamber 50 through the discharge port 37 and chute 44 where it may be collected in any suitable manner. The duration of this air blast for pressurized cleaning of chamber 50 can be controlled by adjustment of valve 120. At the end of the time cycle for the cleaning of chamber 50, the solenoid switch 92 will operate so that cylinder 62 is moved rearwardly causing the retraction of the pickup tube from the conduit 12. Thereafter, according to the preset time cycle, the above described sequence of events will be repeated. If at any time, the source of electric current should stop, switch 92 would be deenergized whereby the normal position as between air lines 78 and 80 relative to line 70 is that line 78 is an air flow connection with line 70. Thus, should the electric power fail there will generally be sufficient built up air pressure to move through lines 78 so that the pickup tube will come to rest in its retracted position.

The air ejection system described above provides a more complete and substantially cleaner evacuation of the sampling material from the pickup tube over the screw auger system now in use and leaves the pickup chamber thoroughly clean for the next pickup operation.

Accordingly, from all of the foregoing, it is thought a full understanding of the construction and operation of this invention will be had and the advantages of the same will be appreciated.

We claim:

1. In an automatic material sampling device of the type wherein a sample picukp tube is extended for a timed interval into free flowing material moving in a confined path to collect a sample amount of said material and said pickup tube is then withdrawn from said confined path with a collected sample of said material, the combination therewith of an improved means for removing the collected material from said pickup tube after said tube is out of communication with said flowing material, comprising:

said pickup tube having a pickup end and being provided with a discharge port remote from said pickup end, an air line connected to said pickup tube and designed for connection to a source of air under pressure, and, a time control valve means connected to said air line and said source of air under pressure to release air under pressure for a selected time interval into said pickup tube only after said pickup end has collected a sample of material and moved out of said confined path to effect the removal therefrom of said collected material out of said discharge port.

2. Apparatus as defined in claim 1 including means operatively associated with said pickup tube to automatically actuate said time control valve when said pickup tube moves out of communication with said flowing material.

3. Apparatus as defined in claim 1 including:

a housing for said pickup tube, a discharge chute in said housing designed to receive material from said discharge port, and means on said pickup tube for closing said discharge chute while said pickup tube is in communicaiton with said flowing material and opening said discharge chute when said picukp tube is out of communication with said flowing material.

4. Apparatus for extracting samples of free flowing material passing through a conduit, comprising:

a material sampling pickup tube having a material pickup end portion, means mounting said pickup tube relative to said conduit so that said pickup end portion can be projected into said conduit transversely of the direction of flow, means for selectively projecting said pickup end portion into said conduit and for withdrawing said end portion therefrom, means on said pickup end portion for intercepting and collecting sample amounts of material from said conduit, said pickup tube being provided with a discharge port remote from said pickup end portion, air pressure means operatively connected with said pickup tube for directing air under pressure into said picup tube to force the collected sample material out of said discharge port, and means operatively associated with said pickup tube and said air pressure means to actuate said air pressure means relative to said pickup tube upon the withdrawal of said pickup tube from said conduit.

5. Apparatus as defined in claim 4 including:

a housing enclosing said pickup tube, a discharge chute in said housing, the end of said pickup tube movable into and out of said conduit being closed, said sample collecting means being a slot in the wall of said pickup tube closely adjacent said closed end, a plug member in said pickup tube extending from the other end thereof toward but not to said closed end so as to provide a sample material collecting chamber in communication with said slot and said discharge port, an air tube diametrically smaller than said pickup tube and concentrically disposed therein so as to extend through said plug, a portion of said air tube being disposed within said collecting chamber and said portion being provided with an air outlet port, the length of said plug being such that it serves as a closure for said discharge chute when said pickup end portion is within said conduit and opens said discharge chute to said discharge port in said collecting chamber when said pickup end portion is retracted from said conduit, and an air line associated with said air pressure means and connected to that end of said air tube disposed within said plug.

6. Apparatus as defined in claim 5 including:

a mounting plate, means mounting said pickup tube to said mounting plate for slidable movement therethrough, a support frame mounted on said mounting plate, a two way air cylinder carried by said support frame and operatively connected to said air pressure means, a timed control switch means associated with said air pressure means to effect movement of said air cylinder in two respective opposite directions according to a predetermined cycled interval, means connecting said air cylinder to said pickup tube to effect its projection into and withdrawal from said conduit on a predetermined cycled interval, a timed control air valve mounted to said support frame and connected to the air line to said air pipe, an air valve on said support frame connected to said air pressure means and said timed control air valve and normally closing air flow to said timed control valve, said air valve disposed to be actuated by contact from said air cylinder when said air cylinder has moved to a position withdrawing said pickup tube from said conduit and said discharge port is in registration with said discharge port, and the actuation of said air valve opening air flow to said timed control air valve whereby air under pressure is delivered to said air pipe for a predetermined interval to remove material in said collecting chamber out of said discharge port.

References Cited

UNITED STATES PATENTS

| | | | |
|---|---|---|---|
| 2,540,059 | 1/1951 | Stirn et al. | 229—194X |
| 2,589,712 | 3/1952 | Langsenkemp et al. | 73—422 |
| 2,683,373 | 7/1954 | Gallup et al. | 73—422 |
| 3,201,001 | 8/1965 | Roberts et al. | 222—194 |

FOREIGN PATENTS

| | | | |
|---|---|---|---|
| 365,204 | 1/1932 | Great Britain | 73—422 |

LOUIS R. PRINCE, Primary Examiner

D. M. YASICH, Assistant Examiner

U.S. Cl. X.R.

73—423; 222—194